United States Patent [19]
Gutekunst

[11] 3,810,486
[45] May 14, 1974

[54] VALVE FOR USE IN HYDRAULIC MACHINES

[75] Inventor: Werner Gutekunst, Partenstein, Germany

[73] Assignee: G. L. Rexroth GmbH, Lohr/Main, Germany

[22] Filed: Feb. 2, 1973

[21] Appl. No.: 329,190

[30] Foreign Application Priority Data
Feb. 10, 1972 Germany............................ 2206308

[52] U.S. Cl............. 137/269, 137/296, 137/625.33, 251/361, 251/367
[51] Int. Cl.......................... E03b 9/02, F16k 35/06
[58] Field of Search. 137/269, 798, 625.37, 625.38, 137/296, 294, 625.33, 366, 367, 371, 382, 272, 625.4; 251/144, 361, 146, 367, 148

[56] References Cited
UNITED STATES PATENTS

| | | |
|---|---|---|
| 94,749 | 9/1869 | Holly .................................. 137/294 |
| 260,397 | 7/1882 | Hunter................................. 137/296 |
| 381,940 | 5/1888 | Mellert ............................... 137/294 |
| 2,576,631 | 11/1951 | Mueller et al. .................. 137/296 X |
| 1,284,063 | 11/1918 | Davis et al. ....................... 251/144 X |
| 2,164,039 | 6/1939 | Meyer et al...................... 251/144 X |
| 3,593,745 | 7/1971 | Myers ............................... 137/625.4 |

*Primary Examiner*—Henry T. Klinksiek
*Assistant Examiner*—Robert J. Miller
*Attorney, Agent, or Firm*—Michael S. Striker

[57] ABSTRACT

The novel valve can be used immersed in a liquid or it can be interposed in a conduit. It has a valve mechanism surrounded by a valve housing composed of an inner housing section and an outer housing section which surrounds the inner housing section. The inner housing section is used by itself in conjunction with the valve mechanism when the valve is installed immersed in a liquid, and when the valve is to be used interposed in a conduit both housing sections are employed.

5 Claims, 1 Drawing Figure

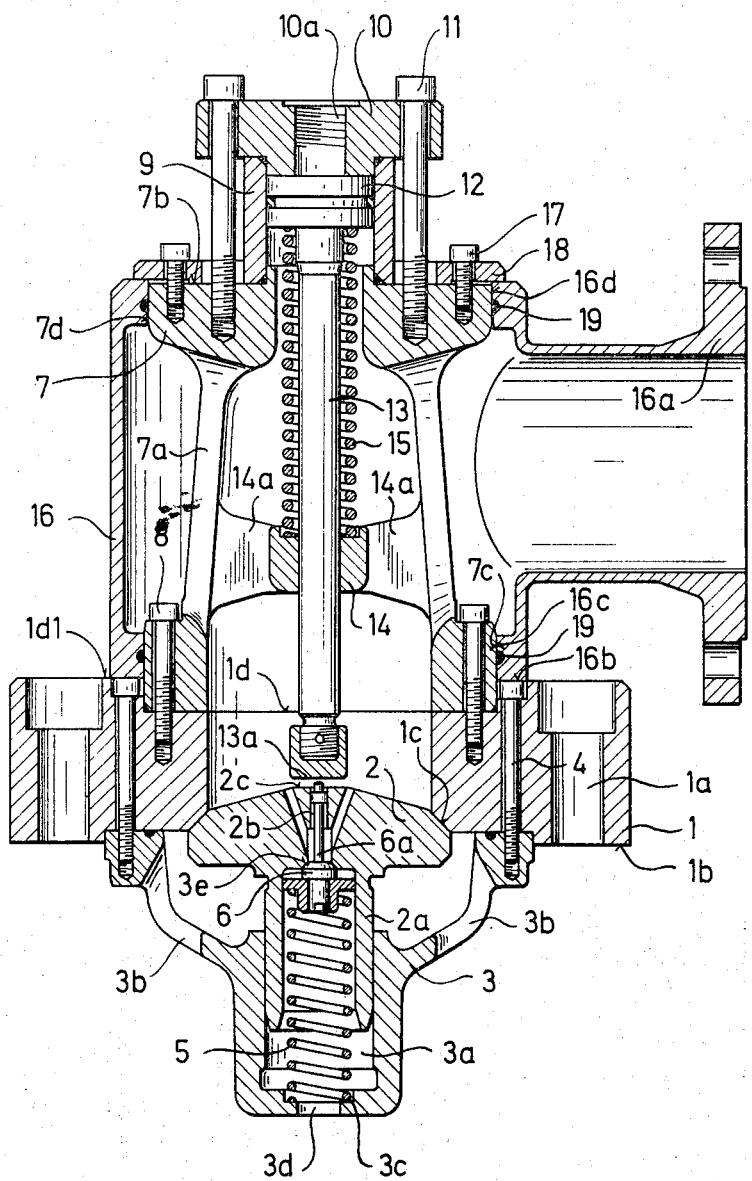

VALVE FOR USE IN HYDRAULIC MACHINES

BACKGROUND OF THE INVENTION

The present invention relates to a valve in general and more particularly to a valve for uSe in hydraulic machines. Still more particularly it relates to a filling and discharging valve for use in hydraulically operated machines.

Hydraulically operated machines use filling and discharge valves whose purpose is to increase the inlet and outlet speed of hydraulically operated machines without having to increase the installed machine capacity. This type of valve can either be mounted directly on the cylinder head of the hydraulic machine, or especially if the container with the working fliud for the machine is mounted directly on the cylinder head, the valve can be used as a connecting component between the cylinder space and the fluid-containing reservoir. In the latter case it is usually mounted on the bottom of the reservoir within the latter.

If the valve is employed in an application of the type mentioned first, that is where the reservoir is arranged separately from the cylinder of the hydraulic machine, the valve is connected with its housing in the conduit communicating the cylinder of the machine with the reservoir. If the valve is mounted in the reservoir itself on the bottom wall thereof, the valve housing is provided with a plurality of openings for the inlet and the outlet of the working fluid.

The problem with the prior-art valves of this type has always been until now that separate valves have had to be provided for the aforementioned two different types of installations. This means increased stock-keeping and frequently difficulties in supplying the particular type of valve that is required for a particular use, because the type of valve which can be used for one kind of installation cannot be used for the other kind, and vice versa.

SUMMARY OF THE INVENTION

It is therefore a general object of the present invention to provide an improved valve of the type in question which avoids the disadvantages of the prior art.

More particularly it is an object of the invention to provide an improved valve for use in hydraulic machines which can be used in installations requiring it to be mounted within the fluid reservoir, as well as in installations requiring it to be interposed in a conduit connecting the fluid reservoir with the cylinder of the hydraulic machine, for instance a hydraulically operated press or the like.

Another object of the invention is to provide such a valve which is relatively simple and reliable in its construction and operation.

In keeping with these objects, and with others which will become apparent hereafter, one feature of the invention resides in a valve for use in hydraulic machines which, briefly stated, comprises a valve mechanism and a valve housing surrounding the valve mechanism. The valve housing comprises an inner housing section and an outer housing section surrounding the inner housing section. One of these housing sections is adapted to be used if the valve is to be installed immersed in a liquid, and both of the housing sections together are adapted to be used if the valve is to be installed in a liquid-carrying conduit.

Evidently, the valve according to the present invention has certain significant advantages over what is known from the prior art. It is therefore now only necessary to provide a single valve for both types of applications, and this clearly reduces the problems involved in manufacturing the valves as well as in the keeping of stock. Moreover, by using two valve housing sections one of which is located within the other the valve housing is rather sturdy and is thus capable of withstanding even unusually severe operating conditions, for instance conditions as they are encountered if the valve is used in a hydraulically operated press. One of the valve housing sections, the outer one, is provided with a flange for connection with a conduit and it is advantageous if it is configurated as a tubular element. The other valve housing section, the inner one, is concentrically and sealingly received within the outer one and is provided with openings for the liquid, being advantageously of substantially cage-shaped configuration.

The valve housing section provided with the flange may be connected via a retaining ring with the inner valve housing section, and this has the advantage that it simplifies the installation of the valve in a conduit due to the fact that the flange on the outer housing section can be continuously adjusted in the direction towards the mating flange of the conduit during installation. This substantially reduces the effort and time required for moving the two flanges into mating relationship in which they can be connected.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

BRIEF DESCRIPTION OF THE DRAWING

The single FIGURE is an axial section through a valve according to one embodiment of the invention.

DESCRIPTION OF THE PREFERRED EMBODIMENTS

The FIGURE illustrates an exemplary embodiment of the novel valve for use in hydraulic machines. Reference numeral 1 designates a mounting plate which in the illustrated embodiment is of circular outline and provided in its outer marginal portion with a plurality of equi-angularly spaced mounting holes 1a. The surface 1b of the plate is to be placed into abutment with a component in which the valve is to be mounted, and in particular with the cylinder head of a non-illustrated hydraulically operated machine, for instance a press, or with the bottom wall at the inside of a fluid reservoir of such a machine. The plate 1 is further provided with an annular seating surface 1c for a main valve body 2 of generally conical configuration which is provided with a cylindrical extension 2a extending into a bore 3a of the portion 3 of the valve housing. The portion 3 is connected via screws or bolts 4 to the plate 1 and is provided with equi-angularly spaced openings 3b for passage of the hydraulic fluid. A bottom 3c of the portion 3 has a bore 3d and located within the portion 3, in the bore 3a thereof, is a helical spring 5 which abuts against the bottom wall 3c and bears against the valve member 2. A control member 6 is accommodated in a bore of the valve member 2 which latter is provided with a valve seat 3e engaged by the control member 6 which is also biased by the spring 5 so as to normally engage the valve seat 3e. This construction means that the spring 5 normally urges both the valve member 2 and the control member 6 to closed position, so that the use of separate springs for the members 2 and 6 can be avoided, simplifying the valve construction.

The upper side of the plate 1 is provided on the surface 1d thereof with a substantially cage-shaped housing section 7 which is mounted thereon with the screws or bolts 8. The housing section 7 is provided with equiangularly spaced openings 7a provided in its circumference, for admission and passage of the working fluid. An end portion 7b of the housing portion 7 is located remote from the plate 1 and is provided with a tubular portion 9 which is sealingly connected to it; the upper free end of the portion 9 is closed by a cover 10, the latter being held by screws or bolts 11 which are threaded into tapped bores of the portion 7b. The cover 10 is provided with a tapped opening 10a for connection to a source of control fluid. The tubular portion 9 serves as a cylinder for an actuating piston 12 a piston rod 13 of which has an end 13a which is to act upon the portion 6a of the member 6, which portion 6a is guided in a bore 2b of the member 2. When the portion 13a has displaced the member 6 inwardly of the member 2 in response to downward movement of the piston 12, it will contact and cooperate with the surface 2c of the member 2. Piston rod 13 is guided in a sleeve 14 which is connected with the remainder of the housing section 7 by means of webs 14a and against which there abuts a helical spring 15 surrounding a portion of the piston rod 13 and abutting with its other end against the piston 12 in a sense urging the same to the position illustrated in the drawing.

The valve housing further comprises an outer housing section 16 which is of tubular configuration and concentrically surrounds the housing section 7. The housing section 16 has a connecting flange 16a by means of which it can be connected to a conduit and a retaining ring 18 is provided which is secured by the screws or bolts 17 to the end portion 7d of the inner housing section 7 and overlies with its outer margin a portion of the outer housing section 16, thus holding the housing sections in predetermined relative relationship against unintentional separation.

The housing section 16 has a contact face 16b which engages the surface 1dl at the upper side of the plate 1 as illustrated. The lower end region and the upper end region of the housing section 16 are provided with inner annular surfaces 16c, 16d each provided with one or more annular grooves in which there are accommodated annular sealing rings 19 which contact appropriately machined juxtaposed annular sealing surfaces 7c, 7d of the housing section 7.

If the valve according to the present invention is to be itself in a reservoir containing working fluid, the housing section 16 is removed from the housing section 7 after first removing the screws 17 and the ring 18. The valve is then installed in the reservoir and working fluid can flow to and from the valve seat 1c through the openings 7a with a minimum of resistance.

The spring 5 which normally maintains the valve member 2 in the closed position illustrated in the drawing has a flat spring characteristic to assure that the valve member 2 will move to open position during the filling operation, as a result of the suction which develops in the cylinder with which the valve communicates.

During the operating cycle during which the working fluid is expelled from the cylinder the valve member 2 must be moved out of contact with the valve seat 1c by means of the piston 12, for which purpose pressurized control fluid is admitted via the inlet 10a, causing the piston 12 to move downwardly whereby the end portion 13a of the piston rod 13 displaces the portion 6a of the member 6, causing the latter to move out of engagement with the valve seat 3e. This results in an initial relief of the interior of the cylinder of the hydraulic machine, and subsequently and during continued downward movement of the piston 12 under the influence of pressure fluid admitted through the inlet 10a, the engagement of the end portion 13a with the surface 2c causes the valve member 2 to be lifted off its valve seat 1c.

If the valve is to be installed in a conduit, then it is utilized with the housing sections 7 and 16 in their relative positions as illustrated, and connected via the flange 16a to a mating flange of the conduit.

It will be understood that each of the elements described above, or two or more together, may also find a useful application in other types of constructions differing from the types described above.

While the invention has been illustrated and described as embodied in a valve for hydraulic machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential features of the generic or specific aspects of this invention and, therefore, such modifications should and are intended to be comprehended within the meaning and range of equivalence of the following claims.

What is claimed as new and desired to be protected by Letters Patent is set forth in the appended claims:

1. A valve for use in hydraulic machines, comprising a valve mechanism; a valve housing comprising an inner housing section surrounding said valve mechanism and being adapted to be used alone if said valve is to be installed immersed in a liquid, and an outer housing section surrounding said inner housing section if said valve is to be connected to a liquid-carrying conduit; and means for selectively attaching said outer housing section to said inner housing section if said sections are to be used together.

2. A valve for use in hydraulic machines, comprising a valve mechanism; and a valve housing comprising a substantially cage-shaped inner housing section surrounding said valve mechanism and being adapted to be used alone if said valve is to be installed immersed in a liquid, and a substantially tubular outer housing section concentrically and sealingly surrounding said inner housing section and being provided with a flange for connection to a conduit if said valve is to be connected to such conduit, said inner and outer housing sections bounding a space communicating with such conduit via said flange and with the interior of said inner housing section.

3. A valve for use in hydraulic machines, comprising a valve mechanism; and a valve housing comprising an inner housing section surrounding said valve mechanism and having a circumferential wall provided with apertures and at least one first sealing surface, and a substantially tubular outer housing section concentrically surrounding said inner housing section and having at least one flange for connection to a conduit and at least one second sealing surface juxtaposed and concentric with said first sealing surface, at least one of said sealing surfaces being provided with at least one annular groove and with at least one annular sealing element partly accommodated in said groove and sealingly engaging the other of said sealing surfaces, whereby the space bounded by said inner and outer housing sections communicates with the conduit via said flange and with the interior of said inner housing section through said apertures, and is sealed with respect to the exterior of said outer housing section.

4. A valve as defined in claim 1, said outer housing section having a tubular shape and being provided with at least one flange for connection to a conduit; and wherein said inner housing section is provided with a circumferential wall having apertures and is concentrically and sealingly surrounded by said outer housing section when the two are used together, with said apertures communicating with the interior of said other housing section.

5. A valve as defined in claim 4; and wherein said attaching means is a connecting ring connecting said housing sections against unintentional separation.

* * * * *